Inventor:
Erich Friedrich Puls

Inventor:
Erich Friedrich Puls

Fig. 8
Fig. 7
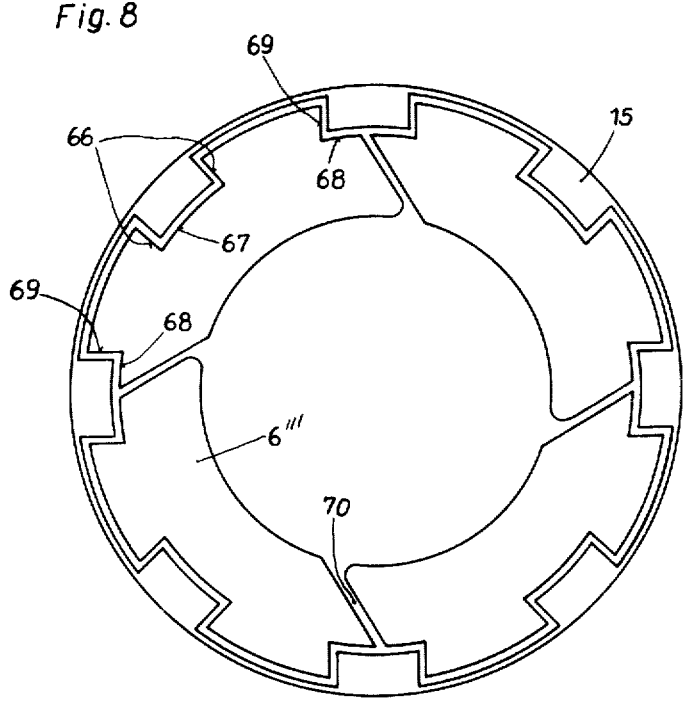
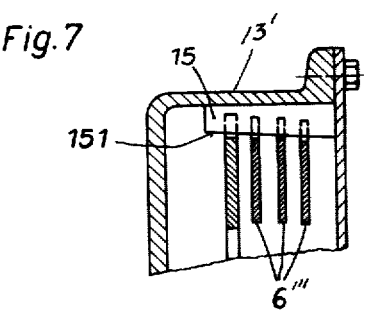
Inventor:
Erich Friedrich Puls

United States Patent Office 3,205,988
Patented Sept. 14, 1965

3,205,988
FRICTION CLUTCH FOR HIGH LOADS
Erich Friedrich Puls, Karlsruhe, Germany; Gertrud Puls, nee Schröter, executrix and trustee of said Erich Friedrich Puls, deceased
Filed Sept. 10, 1962, Ser. No. 222,483
Claims priority, application Germany, Sept. 27, 1961, P 27,937
14 Claims. (Cl. 192—69)

The present invention relates to a single-plate or multiple-plate friction clutch for high loads, and in which upon engagement inner disks connected with the driving member are pressed against circular outer disks on the driven member which engage with the inner disks.

In the known embodiments of such single plate or multiple plate clutches in which the inner and outer disks customarily consist of steel, the load carrying capacity is limited since the power per square centimeter of disk surface transmitted upon engagement by friction between the coupling disks is too small. Considerable difficulties due to distortion of the individual disks oppose an increase in the load-transmitting capacity. Such a detrimental distortion is produced by the sudden high heat stress which occurs upon engagement due to the conversion of the slippage into heat. It has been found that this sudden supplying of heat upon engagement subjects the disks to strong wear, the effect of the heat pulse being limited in unfavorable fashion to the surface of the disks due to the excessively low heat conductivity of the material of which the disks are made. When the relative heat conductivity of the disk material is exceeded, i.e., when a pulse-like heating which cannot be equalized within the material of the disk sufficiently rapidly by heat conduction takes place, contraction occurs at the outer layer of the disk since the suddenly heated outer layer is prevented from expanding by the fact that the material at the center is still cold. As soon as the elastic limit of the material is exceeded in this process, the surface shrinks with respect to the center. Upon recooling, high tensile stresses remain in the surface of the material.

The occurrence of such stresses depends on the local points of action of the heat pulse and is conceivable, both in the region of the outer periphery and on the inner periphery, due to the fact that the different resting surfaces of the disks cannot be determined in advance. If the tensile stresses produced by shrinkage are located at the outer periphery of the disks, the disks are deformed conically while if the tensile stresses are on their inner periphery, a bead-like deformation occurs.

It has already been attempted to limit the injurious deformation of the disks by countermeasures. It is known to relieve plate-shaped inner disks from the said tensile stresses by providing slots in the disk plates, without doing away with the coherence of the disks as a single plate. In the case of such a disk, there is a certain ability to yield to thermal stresses, and a rigid-conical deformation cannot occur when there is suitable subdivision. However, the problem of the deformation of the disks is not yet satisfactorily solved in this manner, since the transfer of the same principle to the outer disks which are especially endangered with respect to thermal distortion, cannot be effected in satisfactory manner. Since the outer disks must have an annular surface of contact with the inner disks, the outer disk cannot be as extensively subdivided as the inner disk, and sufficient protection of the outer disk from conical or bead-like deformation can therefore not be obtained by the use of slits. Furthermore, slits increase the danger of breakage of the disk.

Since, in general, use is made in a clutch of a pack of disks in connection with which a plurality of plate disks arranged one behind the other is provided, the nonpredictable distortion of the individual disks is particularly unfavorable, due to the fact that the direction of application in the pack can change. As a result of the distortion, a continuous bracing of the disks against one another is brought about, so that the disk clutch cannot coast even in disengaged operating condition, but a residual frictional transfer is continuously maintained. As a result of the generation of heat brought about in this way, the thermal load on the disks and the deformation increase greatly until the clutch finally becomes unusable.

The present invention has as its object to develop single-plate or multiple-plate friction clutches of high load transmission power. The essence of the invention is seen in the fact that the inner disks and/or the outer disks are composed of at least two and preferably a large number of segment parts which are completely separated from each other, and have limited displaceability at least in axial direction. The annular surface is thus by this novel basic principle divided into a plurality of portions. Since no closed annular surface is present, tensile stresses which otherwise would give rise to conical or bead-like deformations cannot cause any substantial deformation of the divided disks. The attachment of such a pack of disks is not made difficult by the application of the invention. One can for instance provide lugs, developed on the segment parts, and suspend them alongside of each other from corresponding holding bolts on the holding basket. In connection with the subdividing of the circular or annular surfaces, it is to be seen to it that the joints are staggered essentially from the direction of the slots of the opposing disk. In this way, there is obtained, even in cooperation with single-piece radially slotted inner disks a disturbance-free operation and individual segments of the outer disks cannot hook themselves in the slots of the inner disks.

It has been found advisable to keep the number of segment parts of a split disk at least one larger or smaller in number than the number of slits in the mating disk. The number of segment parts, however, depends on the dimensions of the clutch, and the required load transmission, and more extensive subdivisions may be advisable in particular with large clutch dimensions. The subdivision into segment parts can be effected not only in the outer disk but also in the inner disks of the clutch, in which connection, however, it must always be seen to it by a suitable position of the joints that no hooking occurs between the parts of the inner and outer disks. For many cases of use, the subdivision of the outer disks in combination with non-subdivided inner disks which are, however, protected by slots has been found to be a favorable embodiment.

In order to facilitate the loosening of the coupling disk upon disengagement, it may be advisable in accordance with a further development of the invention that in addition to the axial displacment upon disengagement under the action of centrifugal force, a positive movement of said segment parts in radial direction occurs which increases the distance of the segment part from the axis of rotation, and that the segment parts approach the axis of rotation again upon engagement. Such a possibility of movement facilitates the disengagement of the clutch and thereby creates the prerequisite for coasting in disengaged condition in which case the inner and outer disks are no longer stressed by additional friction engagements.

One advantageous embodiment is so developed that the fastening members have guide surfaces, the inclination of which with respect to the axis of the clutch points in the direction in which the segment parts move axially upon disengagement of the clutch with an increase in the radial distance from the axis of rotation, the recesses provided in the segment parts to receive the fastening members being of such a diameter that a limited axial displaceability on the fastening elements is assured. With such a development, it may be advantageous to select the angle of inclination of the guide surfaces, so that the centrifugal force which causes the axial movement of the segment parts is broken down on the guide surfaces inclined to the axis of the clutch in such a manner into an axial component and a radial component that the axial component overcomes the frictional force which is produced by the radial component on the guide surfaces. In this way the segment parts positively carry out an axial movement which brings about or assists in the disengagement of all individual disks within a pack of disks.

The fastening elements for the suspension of the segment parts can advantageously be conical bolts. Cylindrical bolts which are flattened on the surface thereof facing the axis of rotation can also be used. Another suitable embodiment of the fastening elements consists in the provision of cylindrical bolts installed at an angle to the axis of the clutch.

Since when using conical fastening members, different recesses result on the individual segment parts, there appears more suitable for various kinds of use a different type of fastening which makes possible an identical shaping of the recesses to receive the fastening elements. In this connection, there are used as the fastening elements cylindrical bolts which are so installed in a holding basket for the segment parts that their center axis makes an acute angle with the axis of rotation, the point of intersection between the center axis and the axis of rotation lying on the side of the clutch toward which the segment parts move upon the engagement of the clutch. The recesses for receiving these cylindrical bolts must in this connection, in view of the oblique position of installation, be larger than the bolt diameter in order that axial displaceability is maintained. A similar effect is obtained with a cylindrical bolt installed parallel to the axis of the clutch when this bolt has on its side facing the clutch axis a bevel which is inclined to the axis of the clutch.

It may furthermore be advisable to provide the segment parts with a plurality of slots which are preferably open on one side in order to improve their bending properties. These slots can open on the outer and/or inner periphery of the disk part. In addition, recesses of larger inside diameter, for example of circular shape, can be provided at the bottom of the slots.

The preferred embodiment of the invention relates to steel disks. The segment parts can be provided with a sinter facing, depending on the specific embodiment of the clutch. Furthermore, it appears advisable to use as material for the segment parts of the outer disks a different material than that employed for the inner disks. For example, the segment parts of the outer disks can be made of unhardened steel sheet while hardened alloy material is preferred for the inner disks.

Special cases of use may however also justify the reverse distribution of the material in which the hard material is used in the outer disks and the softer material in the inner disks. In this manner, so-called seizing, i.e., a transfer of material from one disk to the other is avoided upon engagement.

Another advantageous further development which is suitable in particular for extremely high loads has in combination with the clutch a feed device known per se which conveys cooling liquid substantially in radial direction along the surfaces of the disks and in this way counteracts undesired overheating at individual points of contact. The individual segment parts can have a certain curvature or an undulated shape in order to improve the removal and separating at the friction surfaces.

Various embodiments of the subject matter of the invention are shown schematically in the drawing in which:

FIG. 7 is a longitudinal section through the suspension of the segment parts with guide wedges;

FIG. 8 is a top view of the disk guiding shown in FIG. 7.

Figure 1:
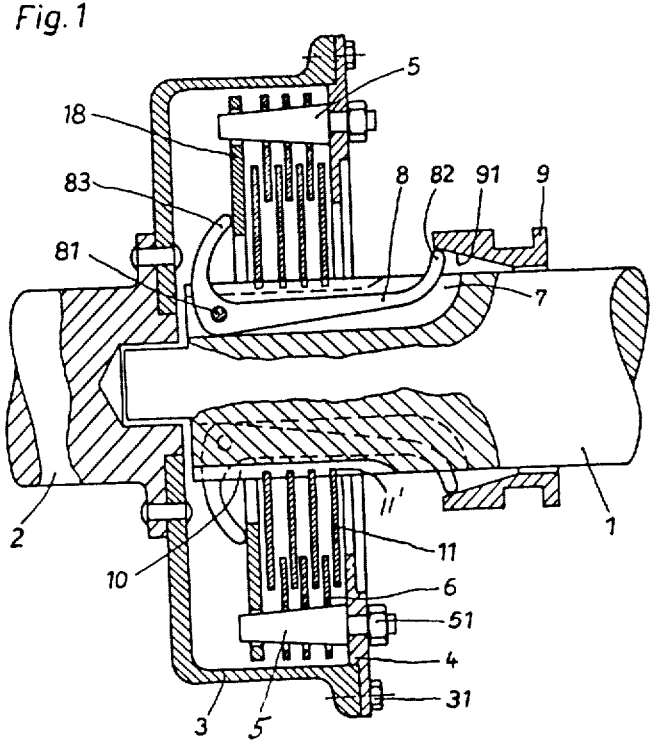
FIG. 1 is a longitudinal section through a multiple-plate friction clutch in accordance with the invention.
Figure 2:
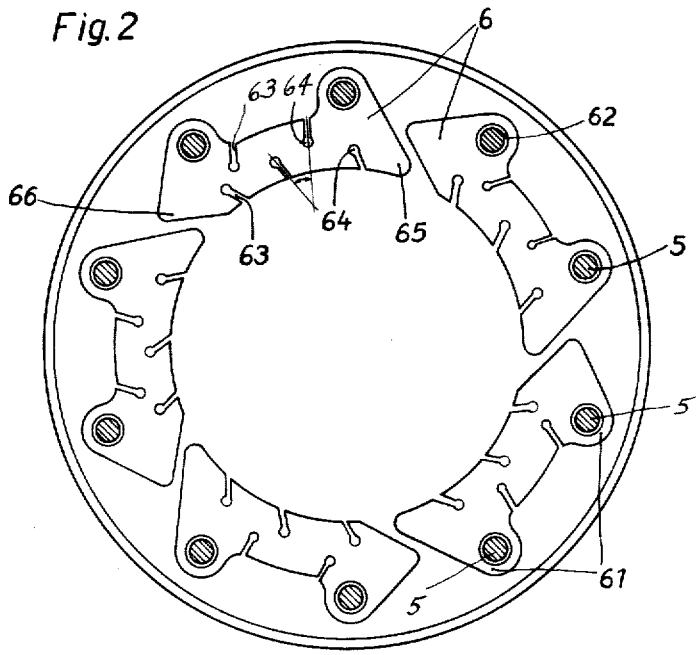
FIG. 2 is a top view of the arrangement of the outer disks in a multiple-plate friction clutch such as shown in FIG. 1.
Figure 3:
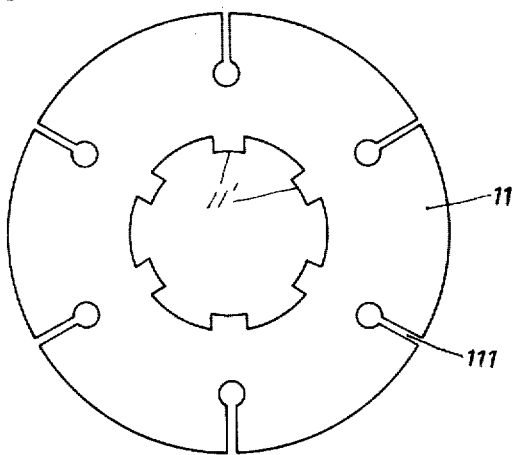
FIG. 3 is a top view of an undivided inner disk in the case of a multiple-plate friction clutch in accordance with FIG. 1.

In order to explain the invention, a mechanically engageable and disengageable multiple-plate friction clutch has been shown in FIGS. 1, 2 and 3, the transmission of power being effected between a driving shaft 1 and a driven shaft 2. On the driven shaft 2, there is provided a holding basket 3 which bears segment parts 6 of the outer disks supported for axial displacement on conical bolts 5 on a holding plate 4. The conical bolts 5 are in their turn fastened by screw connection 51 to the holding plate 4, and the latter is connected to the holding basket 3 by further screw connection 31. The segment parts 6 of the outer disks, the development of which is shown in FIG. 2, have the form of annular parts with lugs 61 formed thereon, the diameter of the recesses 62 being somewhat greater than the diameter of the conical bolts 5.

On each of the segment parts 6, there are provided five linear slots 63 which are open at one end and which have formed at their closed ends the circular recesses 64. The openings of the slots 63 lie alternately on the inside and on the outside of the segment part 6 and the center lines of two consecutive slots 63 form an acute angle as shown in FIG. 2.

The segment parts 6 each have their end edges 65, 66 beveled so that undesired interengagement of the segment parts of the outer disks and of the inner disks is prevented. In the embodiment shown, there are provided five segment parts 6, each of which is supported in a longitudinally displaceable manner on the conical bolts 5 by two lugs 61 formed thereon. The shape of the counter-rotating inner disks 11 having radial slots 111 can be noted from FIG. 3.

For the engagement and disengagement of the clutch, there are provided a plurality of angle levers 8 (FIG. 1) which are rotatably mounted on pivot pins 81 in recesses 7 of the driving shaft 1; the ends 83 of said levers 8 resting against a pressure plate 18. Furthermore, on the driving shaft 1, there is a longitudinally displaceable coupling ring 9 which, on its side facing the angle levers 8 has a conical cam or guide surface 91 for receiving the lever ends 82.

The inner disks are formed as annular plates 11 having inwardly projecting lugs 11' (FIG. 3) which are slidably received in longitudinal grooves 10 of the driving shaft 1 so that such inner disks are longitudinally displaceable on shaft 1. While unhardened steel may be used as the material for forming the segment parts 6 of the outer disks, the annular plates 11 of the inner disks are preferably made of harder material, for instance, hardened steel.

Upon engagement of the clutch, the coupling ring 9 is moved toward the holding basket 3, to cause the ends 82 of the angle levers 8 to come into engagement with the conical guide surface 91, which by a camming action on such ends, effects a tilting movement of the angle levers 8. The pivoting levers 8 cause the longitudinal displaceable segment parts 6 to be pressed together with the annular inner disks 11, which are also longitudinally displaceable by the pressure of the ends 83 thereof against a pressure plate 18. There is thus produced a cross-locked connection between the driving shaft 1 and the driven shaft 2.

Upon the disengagement of the clutch, the coupling ring 9 is withdrawn from the holding basket 3, and the cam surface 91 thereof slides out of contact with the ends 82 of the angle levers 8. Being free from the ring 9, the angle levers 8 can now rotate about their pivots 81 so that their ends 83 lying within the holding basket 3 will move away from the holding plate 4 and thereby loosen the force-locked connection between the segment parts 6 of the outer disks and the annular plates 11 of the inner disks.

Figure 4:
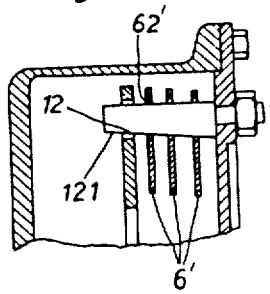
FIG. 4 is a longitudinal section through the suspension of the segment parts with flattened cylindrical bolts.
Figure 5:
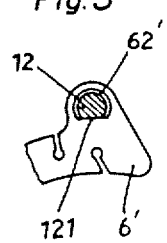
FIG. 5 is a top view of the suspension shown in FIG. 4.

In FIGS. 4 and 5 of the drawings, there is shown another type of fastening for the segment parts 6'. In this construction, the supporting bolt is a cylindrical bolt 12 provided with an oblique guide surface 121 which is so inclined with respect to the axis of the clutch that the segment parts 6' under the effect of centrifugal force will be caused to move out so as to bring about or assist in the release of the clutch parts. In this construction, recesses 62' of the same shape can be provided for all of the segment parts 6', whereas in the case of conical bolts, such as shown in FIG. 1, there are required recesses 62 of different diameters.

Figure 6:
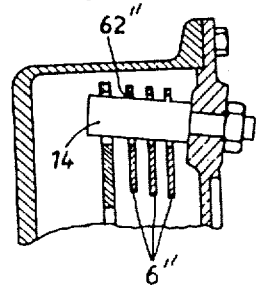
FIG. 6 is a longitudinal section through the suspension of the segment parts on oblique cylindrical bolts.

In the embodiments shown in FIGS. 6, 7 and 8, the same type of segment parts are present in each construction. In the embodiment of FIG. 6, the bolts 14 are cylindrical and are mounted in an oblique position for the suspension of the segment parts 6", and the recesses 62" of the segment parts 6" have a diameter such that axial displacement of such parts on the inclined bolts 14 is possible. In this case, also, the release of the clutch is brought about or assisted by the oblique guiding of the cylindrical bolts 14.

In the embodiment shown in FIGS. 7 and 8, guide wedges 15 are provided which are rigidly connected to the holding basket 13'. Instead of recesses 62, the segment parts 6''' in this construction are provided with grooves 67 which conform to the cross-sectional shape of the guide wedges 15. The manner in which the segment parts are associated with the guide wedges 15 are shown more clearly in FIG. 8. It will be noted that in this construction, four segment parts form the outer disk. Each segment part 6''' is controlled in its movements radially outward by the engagement of its surfaces 67 and 68 with the wedges 15. In their movements in a radially inward direction, the segment parts 6''' are controlled by the side surfaces 69. The torque of the clutch is taken care of by the coaction of the side surfaces 66 and 69 with the wedges 15. All of the guide surfaces of the segment parts 6''' are formed so that there is suitable play between them and the guide wedges 15. On each of the guide wedges 15, there is provided a guide surface 151 which is inclined with respect to the clutch axis. The continuous separating slots 70 between the segment parts are arranged in inclined manner with respect to the radial slots 111 of the inner disk (FIG. 3) so that the slots of the inner and outer disks do not hook into one another.

In the above description and the drawings, only a few examples of segment parts embodying the invention have been disclosed. It will be understood, however, that it is possible to provide other forms of segment parts embodying the essential basic concept of the invention, namely the breaking up of the disks into individual disk parts, and the guiding of such disk parts so that upon disengagement of the clutch, the centrifugal force produced by the rotary movement of the clutch on the individual disk parts will move said disk parts away from the axis of the clutch. It will be understood also that while a multi-plate clutch has hereinabove been particularly described, the invention is equally applicable to a single-plate clutch composed of but a single disk constructed of a plurality of segment parts associated with guide means in the manner above described with respect to the segment parts 6 and bolts 5, 12 and 14 or wedges 15 and cooperating in the same manner to produce the combined axial and radial movements of such segment parts.

In accordance with the principles of the invention, there is provided as a result of centrifugal force and the transmitted clutch torque, a component of force which must be overcome upon the closing of the clutch and which upon the disengagement of the clutch assures a rapid, dependable separation of the clutch disks. This feature has proven to be advantageous, particularly in the case of clutches having a large number of disks. Split disks made in accordance with the invention should be constructed so that the possibility of the disks being distorted by centrifugal forces or deformation forces should be avoided, and particularly so in the region of the slits. The specific load-carrying capacity of the new disks has been found to be considerably greater than that of slit or unslit solid-plate disks, and is now close to the limit of heat absorption capacity of these parts. Disks composed of individual parts have proven fully operable when tested even under the most extreme conditions, for instance when heating too close to the welding point. This limit was previously the distortion limit of the disks, i.e., at a specific load which previously resulted in distortion, curving and tearing of the disks.

I claim:

1. In a friction clutch, a driving member, an inner disk connected to said driving member, a driven member, an outer disk connected to said driven member and engageable with said inner disk when the clutch is engaged, at least one of said disks being composed of two separate, movable segment parts, means for supporting said separate segment parts in assembled relation and controlling the movements of such parts in radial and axial directions relative to the rotational axis of one of said members, said supporting means including members operatively connected to said segment parts and constructed and arranged to cause a radial shift of said segment parts away from such rotational axis when disengaging the clutch, and to cause a radial shift of said segment parts toward such rotational axis when applying the clutch.

2. A clutch according to claim 1, in which said supporting means members are engageable with openings in said segment parts and have inclined guide surfaces which incline away from said rotational axis in the direction in which the segment parts move axially upon disengagement of the clutch to cause the said increase in the radial distance of such parts from such rotational axis.

3. A clutch according to claim 1, in which said supporting means members are conical bolts.

4. A clutch according to claim 1, including a holding basket for the segment parts, and in which said supporting means members comprise cylindrical bolts installed in inclined relation in said holding basket so that the center axes of the bolts make an acute angle with the axis of rotation, the point of intersection between such center axes and said axis of rotation lying on the side of the clutch toward which the segment parts move upon engagement of the clutch.

5. A clutch according to claim 1, in which said segment parts each have a plurality of slots each of which opens on one side of its associated part.

6. A clutch according to claim 1, in which said clutch is composed of two groups of movable inner and outer disks, with the disks of said outer group each composed of separate segment parts, the material of which said segment parts are constituted having a different hardness and being preferably softer than the material of which the inner disks are formed.

7. A clutch according to claim 2, in which the openings provided in the segment parts have a cross-sectional area relative to the cross-sectional areas of the portions of said supporting means members in engagement therewith that said parts have a given limited range of axial displaceability on said members.

8. A clutch according to claim 2, in which the clutch comprises two groups of movable inner and outer disks, with the disks of one of said groups each composed of separate segment parts supported by said supporting means, and in which the angle of inclination of the guide surfaces on said supporting means members to the rotational axis is so selected that the axial movement of the segment parts upon the disengagement of the clutch takes place in positive fashion under the action of centrifugal force to simultaneously increase the spaces between the segment parts of said one group of disks and the radial distances of such parts from the rotational axis.

9. A clutch according to claim 2, in which said supporting means members are cylindrical bolts flattened on their surface facing the axis of rotation, said flattened surfaces constituting said guide surfaces.

10. A clutch according to claim 2, in which said supporting means members are wedges, the surfaces of which facing the rotational axis make an angle with it and constitute said guide surfaces.

11. A clutch according to claim 2, in which said supporting member means comprises a plurality of spaced guide wedges arranged around said segment parts, and in which the openings in said segment parts are constituted of groove-shaped recesses interengaged with said guide wedges to support such parts in suspended relation by said guide wedges.

12. A clutch according to claim 5, in which the slots are linear and are arranged on each segment part so that the open ends thereof lie alternately on the inner and on the outer peripheries of the segment part, and so that the centerlines of two consecutive slots intersect at an acute angle.

13. A clutch according to claim 5, in which the slots are provided at their inner ends with enlarged closed openings.

14. In a friction clutch, a driving member, a first clutch disk connected to said driving member, a driven member, a second clutch disk connected to said driven member and engageable with said first disk when the clutch is engaged, at least one of said disks being composed of two separate, movable segment parts, guide means extending generally in the direction of the rotational axis of one of said members and being secured to the latter in offset relation to such axis thereof, said segment parts being connected to said guide means for slidable movement relative thereto lengthwise of said rotational axis, and means for moving said segment parts axially on said guide means in at least one direction, the segment part engaging surfaces of said guide means being constructed and arranged to cause a radial shift of said segment parts in one radial direction when such parts are moved in said one axial direction by said moving means, and to cause a radial shift of said segment parts in the opposite radial direction when such parts move in the opposite axial direction.

References Cited by the Examiner

UNITED STATES PATENTS

| 1,328,022 | 1/20 | Watson | 192—69 |
| 1,660,497 | 2/28 | Treiber | 192—69 |
| 2,733,798 | 2/56 | Almen et al. | |
| 2,850,118 | 9/58 | Byers | 192—107 |

FOREIGN PATENTS

| 527,062 | 6/31 | Germany. |

DAVID J. WILLIAMOWSKY, *Primary Examiner.*